(No Model.)
S. ADLAM, Jr.
JAR.
No. 300,749. Patented June 24, 1884.
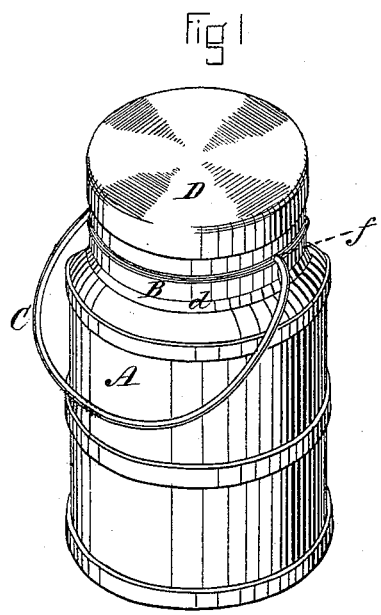
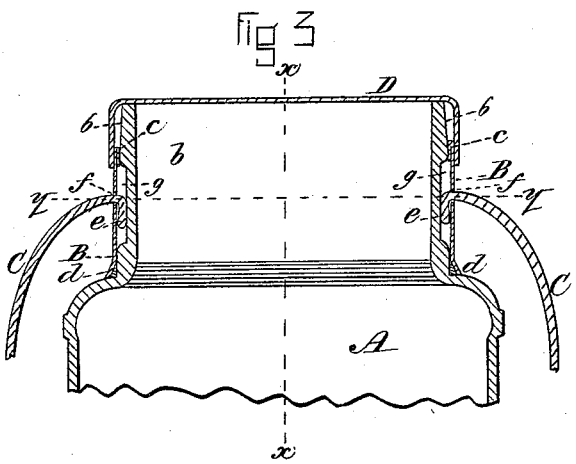
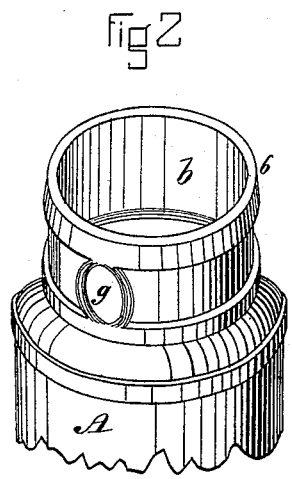
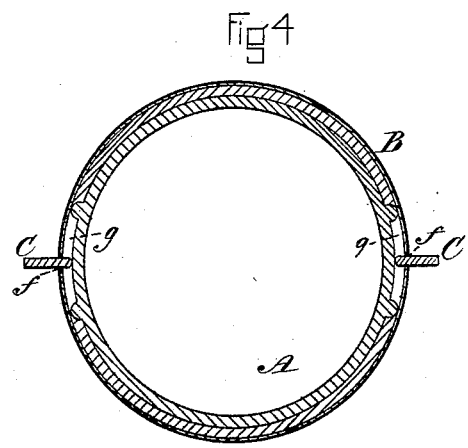
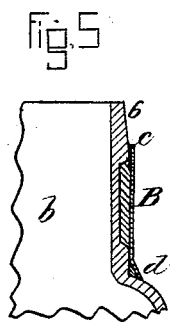
WITNESSES
W. Hambridge
Chas. E. Griffin
INVENTOR
Samuel Adlam Jr.
per P. E. Teschemacher
Atty

UNITED STATES PATENT OFFICE.

SAMUEL ADLAM, JR., OF BOSTON, MASSACHUSETTS.

JAR.

SPECIFICATION forming part of Letters Patent No. 300,749, dated June 24, 1884.

Application filed March 17, 1884. (No model.)

*To all whom it may concern:*

Be it known that I, SAMUEL ADLAM, Jr., a citizen of the United States, residing at Boston, in the county of Suffolk and State of Massachusetts, have invented certain Improvements in Jars, of which the following is a full, clear, and exact description, reference being had to the accompanying drawings, making part of this specification, in which—

Figure 1 is a perspective view of a glass jar constructed in accordance with my invention. Fig. 2 is a view of a portion of the neck of the jar, the metal band or collar being removed. Fig. 3 is a vertical section (enlarged) through the upper portion of the jar. Fig. 4 is a horizontal section on the line $y\,y$ of Fig. 3. Fig. 5 is a vertical section on the line $x\,x$ of Fig. 3.

My invention has for its object to provide for family use a neat, convenient, and durable jar composed of glass or earthenware and having a swinging bail.

Hitherto small jars for household use have been usually made of tin, but such pails are objectionable on account of the difficulty experienced in keeping them sweet and clean and their liability to become corroded by liquids or dampness.

To overcome these difficulties is the object of my invention; and my invention consists in certain details of construction as hereinafter set forth and specifically claimed.

In the said drawings, A represents a jar composed of glass or earthenware, and having its neck or upper portion, $b$, encircled by a metal band or collar, B, preferably of tin, firmly secured in place thereon by means of plaster introduced between the two. This collar B is provided at its top with a turned edge, $c$, which stiffens it and makes a neat finish. The lower edge of the collar B is of slightly-enlarged diameter, forming a lip or flange, $d$, this enlargement serving to accommodate the surplus plaster which is crowded down in the operation of putting on the collar, while it also makes a neat and ornamental finish at this point. The outside of the upper edge of the neck $b$ of the pail is preferably slightly beveled outward and downward, as seen, to facilitate the operation of slipping on or applying the collar B to the neck $b$.

C is the wire bail or handle, the bent ends $e$ of which are hooked into small apertures $f$, formed in opposite sides of the metal band B. These bent ends $e$ project into and turn freely within recesses $g$, formed in the neck or upper portion, $b$, of the jar at points directly opposite to or in line with the apertures $f$ of the collar B, which encircles it. A neat, convenient, and secure means of fastening the ends of the bail to the utensil is thus provided, which will allow the bail to swing freely, as desired, and will also leave the outside of the neck or upper portion of the jar smooth and free from the ordinary projections or ears hitherto employed to receive the hooked ends of a swinging bail, it being an important advantage to dispense with these ears or projections on account of the additional expense involved in securing them in place, while they are furthermore objectionable as they are liable to be broken off, and are also in the way and interfere with the operation of rubbing and cleansing the utensil.

The jar A is preferably provided with a metallic cover, D, which is adapted to fit snugly over the upper edge of the collar B.

What I claim as my invention, and desire to secure by Letters Patent, is—

1. A glass or earthenware jar having its neck or upper portion encircled by a metal band or collar firmly cemented thereto, and provided with a flange, $d$, in combination with a swinging bail or handle, substantially as and for the purpose set forth.

2. The combination, with a glass or earthenware jar having recesses $g$ formed upon opposite sides of the outside of its neck or upper portion, of the metal band or collar B, encircling said neck, and provided at its top with a turned edge, $c$, and at its bottom with a flange, $d$, for the surplus plaster, and having apertures $f$ opposite to the recesses $g$, and the swinging bail or handle C, having its ends $e$ hooked into the apertures $f$ in the band B, and adapted to project into and turn within the recesses $g$ in the neck or upper portion of the pail, all constructed and arranged to operate substantially in the manner and for the purpose described.

Witness my hand this 13th day of March, A. D. 1884.

SAMUEL ADLAM, JR.

In presence of—
P. E. TESCHEMACHER,
W. J. CAMBRIDGE.